United States Patent [19]

McMurtry et al.

[11] Patent Number: 4,736,195

[45] Date of Patent: Apr. 5, 1988

[54] METHOD AND APPARATUS FOR WARNING OF DISCONNECTION OF AN APPLIANCE FROM A POWER SOURCE

[75] Inventors: Christopher J. McMurtry; John W. Poss, both of Portland; Lowell A. Rathbun, Cornelius, all of Oreg.

[73] Assignee: Associates West, Inc., Portland, Oreg.

[21] Appl. No.: 17,914

[22] Filed: Feb. 24, 1987

[51] Int. Cl.⁴ ............................................. G08B 21/00
[52] U.S. Cl. ................................... 340/568; 340/571; 340/572; 340/687
[58] Field of Search ............... 340/568, 571, 661, 687, 340/572

[56] References Cited

U.S. PATENT DOCUMENTS

| | | | |
|---|---|---|---|
| 3,407,400 | 10/1968 | Lurie | 340/568 |
| 3,644,912 | 2/1972 | Allen, Jr. | 340/568 |
| 3,794,989 | 2/1974 | Manley et al. | 340/568 |
| 4,005,399 | 1/1977 | Pazemenas | 340/310 R |
| 4,032,916 | 6/1977 | Galvin et al. | 340/310 R |
| 4,040,045 | 8/1977 | Osborne et al. | 340/568 |
| 4,300,130 | 11/1981 | Fotheringham | 340/568 |
| 4,658,242 | 4/1987 | Zeder | 340/568 |
| 4,680,574 | 7/1987 | Ruffner | 340/571 |

Primary Examiner—Glen R. Swann, III

Attorney, Agent, or Firm—Klarquist, Sparkman, Campbell, Leigh & Whinston

[57] ABSTRACT

In the method of the invention, a signal is injected into the power cord of an appliance and a reference voltage is set in response corresponding to a reference impedance at the point of signal injection. The reference impedance is present with the appliance connected to the power source. The reference voltage is continuously compared against a present voltage corresponding to present impedance at the point of signal injection. An alarm sounds if the present voltage changes to exceed the reference voltage, indicating a higher impedance because the appliance has been disconnected. In one embodiment, the apparatus includes an impedance bridge having an adjustable reference arm for producing a reference voltage corresponding to the impedance of the cord and appliance and a sensing arm for producing the present voltage. In a second embodiment, the apparatus injects an adjustable current into the power cord and appliance for a predetermined time to provide a present voltage. The present voltage is then compared against a reference voltage. The third embodiment is designed for mounting within the chassis of an appliance. The current is injected into the power cord and power source for a predetermined time to produce the present voltage for comparison against a reference voltage.

20 Claims, 4 Drawing Sheets

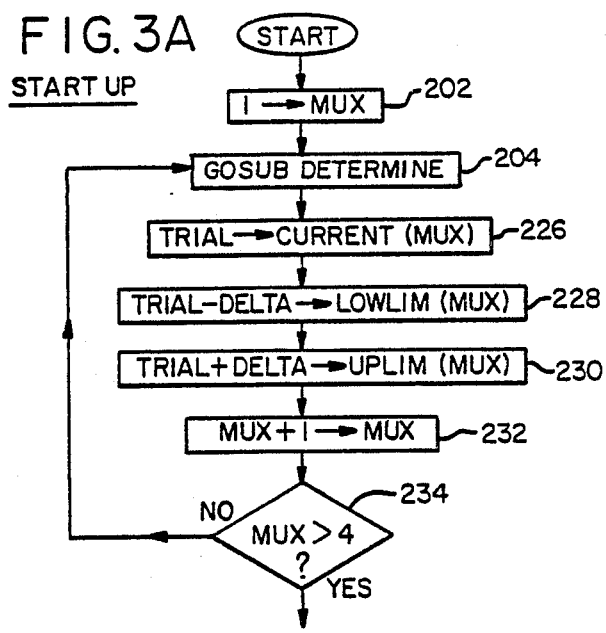
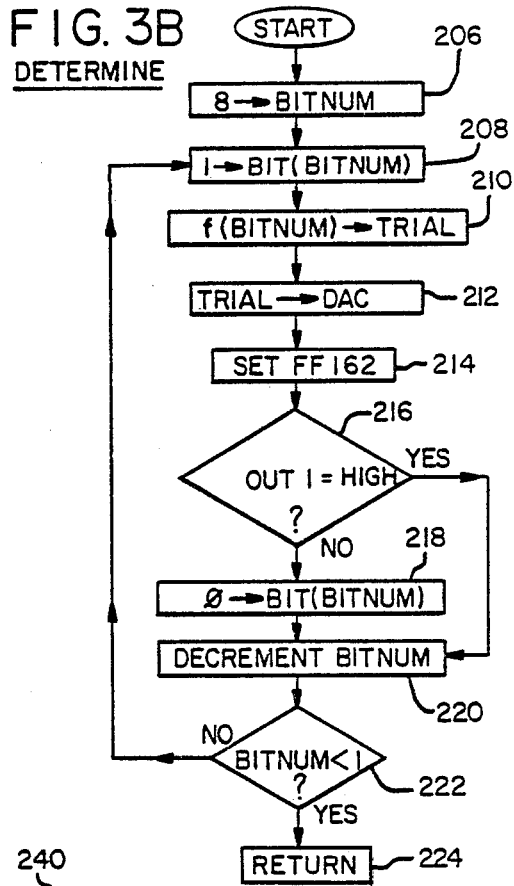
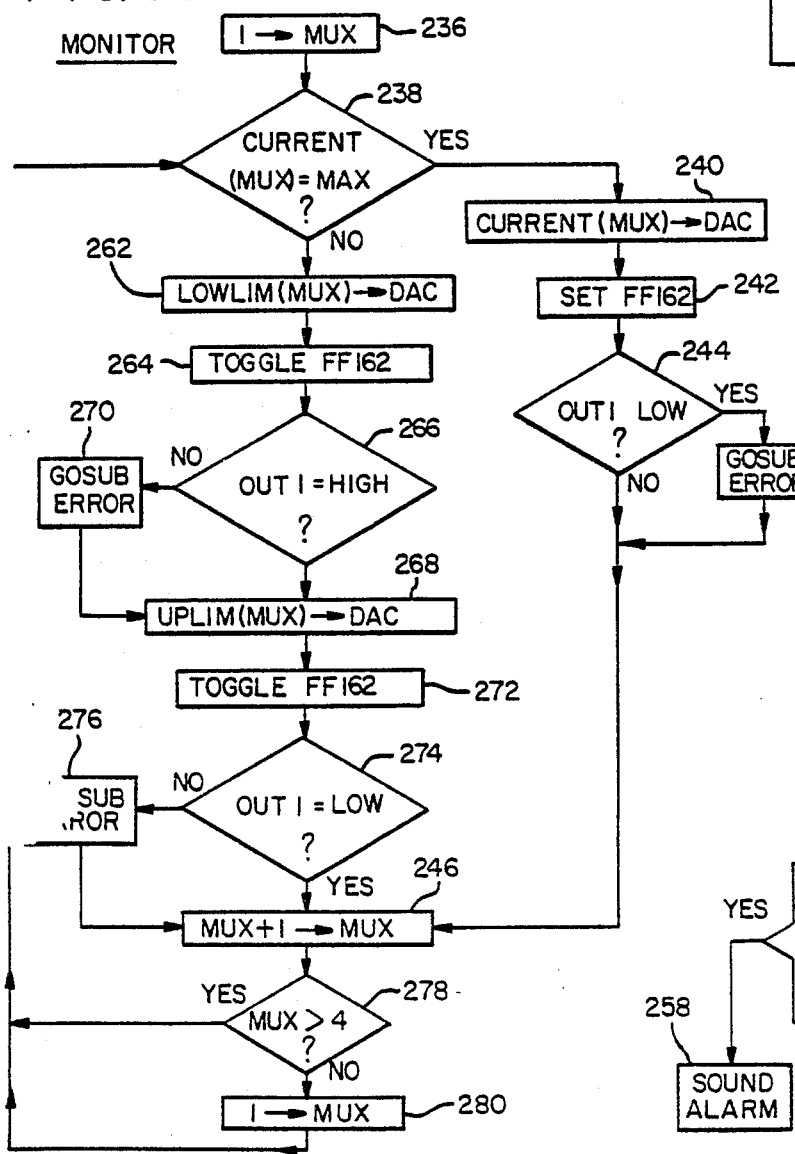
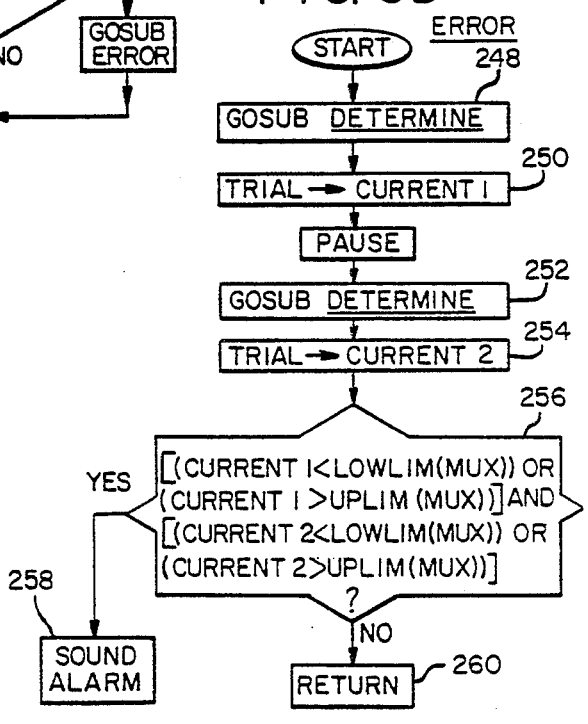

METHOD AND APPARATUS FOR WARNING OF DISCONNECTION OF AN APPLIANCE FROM A POWER SOURCE

TECHNICAL FIELD

This invention relates generally to appliance alarms. More particularly, it relates to an appliance alarm that senses a change in impedance as seen through the appliance power cord caused by the unauthorized disconnection of the appliance from a power source.

BACKGROUND OF THE INVENTION

Security has become an increasing concern in both the home and office with the acquisition of expensive appliances such as computer, printers, or high fidelity stereo systems. These types of appliances are particularly attractive for theft because they are easily transported and fenced but difficult to trace. The danger of theft may be greater in the home than in the office because the value of appliances rarely justifies the cost of an expensive security system. This is especially true for those that rent and cannot recover the cost of a security system.

Realizing this need, particularly in the lodging industry, prior art devices have been designed that monitor a circuit connection between the appliance and a power source such as a wall socket or antenna. If the appliance is unplugged, these devices detect the broken circuit and sound an alarm. However, these prior devices have suffered from a number of drawbacks that have discouraged their widespread use, including questionable reliability, cost, and ease of use. For example, U.S. Pat. No. 3,407,400 to Lurie discloses a theft control system that requires modification of an existing appliance by the addition of a resistor to its power cord. The resistor is added to construct one arm of an impedance bridge formed through the ground prong of the appliance plug. Not only is this device difficult to install for the homeowner, it raises questions of safety since the ground prong is no longer connected to ground. Moreover, nothing in the device prevents the disconnection of the device itself from the power source to circumvent the alarm.

U.S. Pat. No. 3,794,989 to Manley et al. gives an example of another approach in the prior art. Manley establishes a shunt circuit through the ground and neutral prongs of a plug in parallel with an alarm circuit. If the shunt circuit is broken, current flows instead through the alarm circuit to sound an alarm. However, the shunt circuit of Manley is established through rewiring of the ground and neutral plugs of the device to establish the shunt to ground. Not only is this rewiring a difficult task for the homeowner, it also raises questions of a reliable ground from the chassis of the appliance.

Yet a different approach is disclosed in U.S. Pat. No. 4,040,045 to Osborne et al. Osborne utilizes the antenna connection to a television set as a means for detecting disconnection of the set. The resistor is connected across the lines of the antenna connection. If the television set is disconnected, a change in resistance of the antenna line is detected and an alarm sounds. This device, as the other devices of the prior art, requires a complicated installation of elements in an antenna system. Furthermore, the Osborne device works only with appliances that require antennas and have a coaxial connection. The Osborne device is not suitable for appliances such as computers, food processors, or stereo systems that lack coaxial cable-type antennas.

Other examples of prior art devices that have the same or similar drawbacks are disclosed in U.S. Pat. No. 3,644,912 to Allen, Jr.; U.S. Pat. No. 4,005,399 to Pazimenas; U.S. Pat. No. 4,032,916 to Galvin et al.; and U.S. Pat. No. 4,300,130 to Fotheringham.

SUMMARY OF THE INVENTION

An object of the invention, therefore, is to provide an improved apparatus for warning of disconnection of an appliance from a power source.

Another object of the invention is to provide such an apparatus which is easily installed.

Still another object of the invention is to provide an apparatus which is inexpensive and reliable.

A method and apparatus for achieving these objects is described herein. The apparatus includes means for injecting a signal into a power cord of an appliance to be monitored. In response to the injected signal, a reference voltage corresponding to a reference impedance at the point of signal injection is set. The reference impedance is defined as the impedance present at that point with the appliance properly connected to the power source. Sensing means then continue to sense a present voltage corresponding to a present impedance at the point of signal injection. The present and reference voltage are compared. An alarm warns of disconnection if the present voltage exceeds the reference voltage, indicating the appliance has been disconnected from the power source.

In one embodiment of the invention, the apparatus includes an impedance bridge having a reference arm including a variable capacitor and a sensing arm for sensing the impedance of the appliance through the power cord. The variable capacitor is adjusted in response to the injected signal to produce the reference impedance of the power cord and appliance. This impedance is then compared against the present impedance in the sensing arm, such impedance increasing if the cord is cut or the appliance is disconnected from the apparatus.

In a second embodiment of the invention, the apparatus includes a means for producing a current and injecting that current for a predetermined time into the power cord of an appliance. The injected current produces a sensed voltage proportional to the present impedance of the power cord and appliance at the point of signal injection. This voltage is compared against a reference voltage, and the current is adjusted until the sensed voltage is less than the reference voltage. If an appliance is then disconnected, the present impedance changes and the sensed voltage is no longer in predetermined relation to the reference voltage. An alarm is generated as a result.

In a third embodiment, the apparatus is designed to be mounted within the chassis of an appliance. The reference impedance is the impedance looking down the power cord and into the power source. A current is injected into the power cord and the power source instead of the appliance. A present voltage corresponding to the present impedance at the point of signal injection is again compared against a reference voltage. The present impedance will change if the power cord is disconnected from the power source.

The foregoing and other objects, features, and advantages of the invention will become more apparent from the following detailed description of two preferred embodiments which proceeds with reference to the accompanying drawings.

BRIEF DESCRIPTION OF THE DRAWINGS

FIGS. 3A through 3D are flowcharts illustrating the method of operation of the second embodiment in FIG. 2.

DETAILED DESCRIPTION

Figure 1:
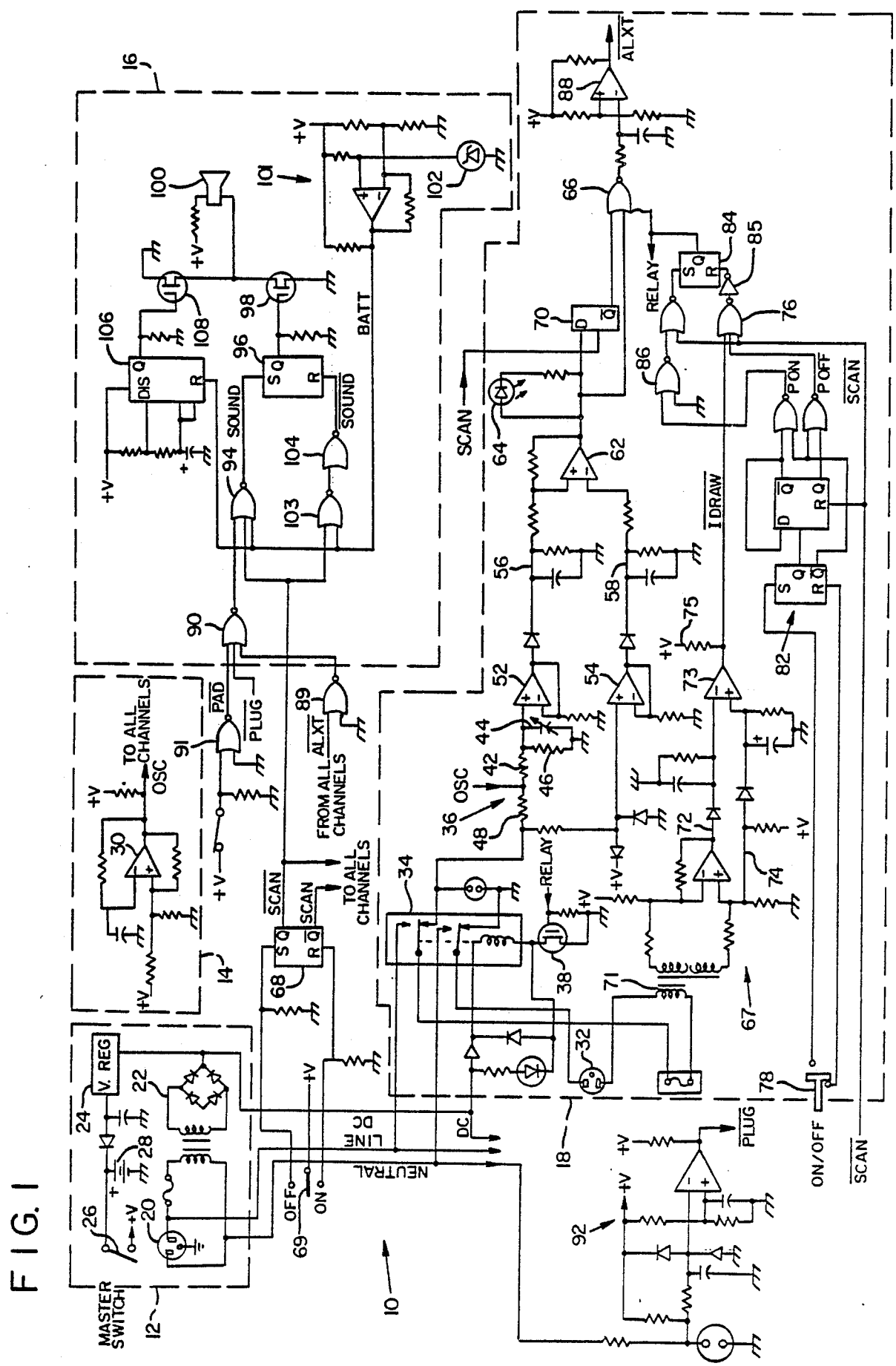
FIG. 1 is a schematic diagram of a first embodiment of an apparatus according to the invention.

FIGS. 1 through 4 show three different embodiments of an apparatus according to the invention. It should be understood that any number of embodiments may be constructed. Three are described and shown here for purposes of illustrating the scope of the invention.

First Embodiment

Referring again to FIG. 1, an apparatus 10 according to the invention comprises a number of interconnected stages including a power supply 12, a square wave oscillator 14, an alarm circuit 16, and a number of channels represented by channel 18. Four or even more channels may be included in the apparatus 10, with one appliance to be connected to each channel for monitoring. Each channel 18 receives control signals from the apparatus 10, as will be described, as well as power from the power supply 12 and a square wave from oscillator 14. In return, each channel sends a warning signal to the alarm circuit 16 to indicate if an appliance is disconnected.

Considering the power supply 12 in detail, it is of standard design for providing both AC and DC voltages. The power supply receives AC voltage from a power source through a male plug 20 and provides that voltage to each of the channels 18 through lines NEUTRAL and LINE. The AC voltage is also rectified by a rectifier circuit 22 to produce a DC voltage for use within the apparatus 10. The rectified signal is routed through a voltage regulator 24 to provide a supply voltage +V to the elements in the apparatus 10. Voltage regulator 24 also charges a battery 28 that provides auxiliary power if the AC voltage is interrupted. The supply voltage is controlled by a master switch 26 that operates the apparatus 10.

Oscillator 14 is a standard square wave oscillator that provides a square wave to all channels 18 as indicated in the figure. The oscillator may be of any number of designs, such as the one illustrated incorporating a voltage comparator 30 with feedback.

The channel 18 couples to the appliance to be monitored through a female receptacle 32 that receives the male plug of the appliance's power cord. The receptacle 32 is connected to the movable contacts of a relay 34 within the channel 18. Relay 34 has two sets of stationary contacts. One set of stationary contacts is coupled to the LINE and NEUTRAL lines from power supply 12. The second set of stationary contacts is coupled to an impedance bridge 36. The relay is energized by a RELAY signal applied to the gate of an FET 38 to draw DC current from the power supply 12. With the movable contacts in the normally closed position as shown, the female receptacle 32 is coupled to the impedance bridge 36. Energizing the relay 34 couples the receptacle 32 to the AC voltage lines to provide power to the appliance.

The impedance bridge 36 comprises two arms, with a reference arm formed by a resistor 42 in series with an adjustable capacitor 44 and parallel leakage resistor 46. A sensing arm comprises a resistor 48 of equal value to resistor 42 and, through relay 34, any impedance at the female receptacle 32. With an appliance plugged into the receptacle 32, the impedance of the appliance is in series with resistor 48.

The square wave signal generated by the oscillator 14 is injected into the midpoint of the bridge 36 and by way of the sensing arm into the power cord of the appliance. The square wave signal is also injected from the midpoint into the reference arm of the bridge 36. The two arms produce voltages proportional to the impedance of each arm. The voltages of each arm are routed through voltage followers 52 and 54 to isolate the voltage signals and then through rectifier circuits 56 and 58 to produce corresponding DC voltages. These voltage levels are then compared at a voltage comparator 62, with the reference arm coupled to the noninverting input and the sensing arm coupled to the inverting input. With the impedance in the reference arm greater than the impedance in the sensing arm, the output of the comparator 62 is a high impedance, preventing the flow of current through an LED 64 connected to the output of the comparator. However, if the impedance of the sensing arm exceeds the impedance of the reference arm, the output of the comparator 62 is a low impedance, allowing current to flow through the LED 64 to the comparator 62 and thereby generating light in the LED.

So configured, the bridge 36 forms a means for setting in response to the square wave signal a reference voltage corresponding to a reference impedance of the monitored appliance and power cord at the point of signal injection. The reference impedance is defined as the impedance present and sensed by the bridge 36 with the monitored appliance properly connected to the power source. In this embodiment, the reference impedance is the monitored appliance and power cord. The reference impedance could as well be the power cord and power source, as is shown and described in the third embodiment. With the appliance connected to the apparatus 10 via the sensing arm of the bridge 36, the capacitor 44 is adjusted until the reference arm impedance is less than the impedance in the sensing arm. This change will cause the LED 64 to light. The value of capacitor 44 is then adjusted to increase the reference impedance enough to exceed the impedance in the sensing arm and turn LED 64 off. The reference impedance is now set.

The sensing arm via relay 34 now serves as a means for sensing a present voltage corresponding to the present impedance at the point of signal injection. If the appliance is unplugged from receptacle 32 or the appliance power cord is cut, for example, the present impedance increases substantially, exceeding the reference impedance. The reference voltage of the reference arm is then compared against the present voltage of the sensing arm by comparator 62 to determine if the impedance has changed. A change in impedance causes comparator 62 to change state and can lead to generation of an alarm signal through a logic gate 66 that receives as an input the output signal of the comparator.

Whether an alarm signal is to be generated depends upon the state of two other input signals to gate 66. One signal is produced by an appliance current sensing circuit 67 at the bottom of FIG. 1. The other signal is produced by a scan circuit comprising a flip-flop 68 and a switch 69. The SCAN signal generated by the scan circuit prevents unused channels 18 from affecting the alarm circuit 16. With respect to voltage comparator 62 and logic gate 66, the SCAN signal is routed to a latch 70 as a clock for clocking the initial state of the voltage comparator into logic gate 66. The initial state is inverted and routed to the logic gate 66. For an unused channel 18, this initial comparator signal state will be a logic LOW because of the high impedance of the open circuit and this logic LOW is inverted to disable the gate 66.

Referring again to the female receptacle 32, the current sensing circuit 67 includes a transformer 71 coupled in series with the receptacle to sense the drawing of current through a connected appliance. A voltage signal sensing the drawn current is routed through a path 72 to an inverting input of a voltage comparator 73. This signal is then compared against a reference voltage in a path 74 that connects to the noninverting input of the comparator. So long as current is drawn by an appliance, the voltage signal in path 72 will exceed the reference voltage in path 74 and the output of voltage comparator 73 will be a low impedance and a logic LOW, indicated by the logic signal $\overline{IDRAW}$. If the appliance is disconnected, however, the reference voltage in path 74 will exceed the voltage signal in path 72 and the output of the comparator 73 will be a high impedance. A logic HIGH then appears at the comparator's output via the supply voltage and pull-up resistor 75.

The logic signal from comparator 73 is combined with two other signals in logic gate 76 that controls the reset of a latch 84. One of the signals, P OFF, originates from a remote key pad represented by switch 78 that turns the appliance on and off. The switch 78 is debounced by circuitry 82 to provide to output signals P ON and P OFF. The signal P ON is a logic HIGH when the appliance is to be on and the P OFF is a logic HIGH when the appliance is to be off. The second signal is a SCAN signal generated by the switch 69 and flip-flop 68. The output of gate 76 is inverted by inverter 85 and routed to latch 84 as the reset signal for the latch.

Setting of latch 84 is controlled by the signals P ON and SCAN. These signals are routed to a logic gate 86 that produces the set signal when switch 78 is turned on, indicating power is to be applied to the connected appliance.

The output signal of latch 84 is determined by the state of its set and reset signals. The output signal is routed to logic gate 66 and also controls the operation of relay 34. Under normal conditions with the appliance switched on, a set signal is generated by logic gate 86 and latch 84 transmits a RELAY signal to the FET 38 to energize relay 34 and connect receptacle 32 to the AC voltage lines. This RELAY signal is also routed to logic gate 66 to disable its output because the sensing arm of the impedance of the bridge 36 is disconnected at relay 34. This disconnection appears as a high impedance that causes the output of comparator 62 to be a logic LOW. If power is shut off or the current is no longer being drawn because the appliance is disconnected, a reset signal is generated by logic gate 76. Latch 84 in response de-energizes relay 34 to connect the impedance bridge 36 to the female receptacle 32 to sense the present impedance at the point of signal injection. With the appliance off but connected, the output of comparator 62 is a logic HIGH and gate 66 is disabled. However, if the appliance is disconnected, the output comparator 62 is a logic LOW and gate 66 is enabled. The output of logic gate 66 is routed to a buffer 88 that produces the alarm signal $\overline{ALXT}$ that is transmitted to the alarm circuit 16. The signal $\overline{ALXT}$ is a logic LOW when an alarm condition exists.

The alarm circuit 16 receives $\overline{ALXT}$ from each channel 18 at an input gate 89 which inverts the signal and logically combines it at a gate 90 with other alarm-generating signals. One of these signals is a $\overline{PAD}$ signal shown originating from gate 91. The signal $\overline{PAD}$ indicates whether the cord to the remote control keyboard containing switch 78 has been cut. Normally a logic LOW, $\overline{PAD}$ becomes a logic HIGH if the control pad is disconnected. The other signal is $\overline{PLUG}$, originating from a disconnect circuit 92. The circuit 92 serves as a means for detecting disconnection of the apparatus 10 itself from the power source. The circuit 92 monitors the connection of the apparatus 10 to the NEUTRAL line of a power source outlet via plug 20. With apparatus 10 connected, $\overline{PLUG}$ is a logic LOW. However, if the connection to ground through NEUTRAL line is broken by unplugging plug 20 or cutting its cord to the apparatus 10, a voltage comparator within circuit 92 changes state and $\overline{PLUG}$ becomes a logic HIGH. The output signal of gate 90 which follows from the states of $\overline{ALXT}$, $\overline{PAD}$, and $\overline{PLUG}$ is logically combined with the SCAN signal and a low battery BATT at a gate 94. The output of gate 94 generates a set signal for a latch 96. If any of the three signals applied to gate 90 is asserted, gate 94 will set latch 96 via a SOUND signal. The latch output signal in turn switches an FET 98 to actuate an alarm such as a buzzer 100.

As briefly mentioned, the alarm circuit 16 includes a low battery signal BATT. This signal is generated by a warning circuit 101 if the battery voltage drops below the reference voltage set by a Zener diode 102. Normally a logic LOW if the battery is charged, the BATT signal becomes a logic HIGH on a low battery condition and disables gate 94 to block the a SOUND signal. The BATT signal simultaneously generates a $\overline{SOUND}$ signal to reset the latch 96 via gates 103 and 104. In turn, the BATT signal also enables a latch 106 configured as a multivibrator to switch on and off an FET 108. The FET 108 actuates the buzzer 100 to beep periodically to indicate a low battery.

As in other stages of apparatus 10, the SCAN signal or its inverse $\overline{SCAN}$ is logically present to prevent unnecessary alarms. In alarm circuit 16, the $\overline{SCAN}$ signal is applied to gates 94 and 103. If the $\overline{SCAN}$ signal is a logic HIGH, indicating the apparatus is switched off, both gates 94 and 103 are disabled.

The operation of the apparatus 10 includes a start-up phase and a monitoring phase. In the start-up phase, the apparatus 10 is first switched on via its master switch 26. The scanning switch 69 is set to the off position to disable the buzzer 100 and allow adjustment of the bridge 36. An appliance to be monitored is connected to a channel 18. The adjustable capacitor 44 on the impedance bridge 36 of each connected channel is then adjusted in response to the signal injection from oscillator 14 to produce the reference impedance of the appliance by monitoring LED 64. Once the impedance of each connected appliance is determined, scanning switch 69 is moved to the on position to lock out unused channels.

In the monitoring phase, the sensing arm of bridge 36 is connected to the appliance whenever relay 34 is de-energized. This condition occurs if an appliance is turned off or otherwise disconnected. The present impedance at the receptacle 32 is then sensed and compared against the reference impedance by comparing the corresponding voltages. If the present impedance is greater, $\overline{ALXT}$ is generated and buzzer 100 sounds.

To prevent disconnection of the apparatus 10 itself from the power source, the $\overline{PLUG}$ signal is generated by disconnect circuit 92. So long as the plug 20 of the apparatus 10 is connected to a power source, the $\overline{PLUG}$ signal is a logic LOW. However, if the plug 20 is disconnected or cut, the circuit to ground through the NEUTRAL line is broken and the $\overline{PLUG}$ signal changes state, causing the buzzer 100 to sound.

The alarm can also be generated during the monitoring phase by cutting the cord of the key pad that controls the connected appliances. The signal $\overline{PAD}$ is normally a logic LOW but changes state to sound the buzzer 100 if the key pad cord to apparatus 10 is cut.

Second Embodiment

Figure 2:
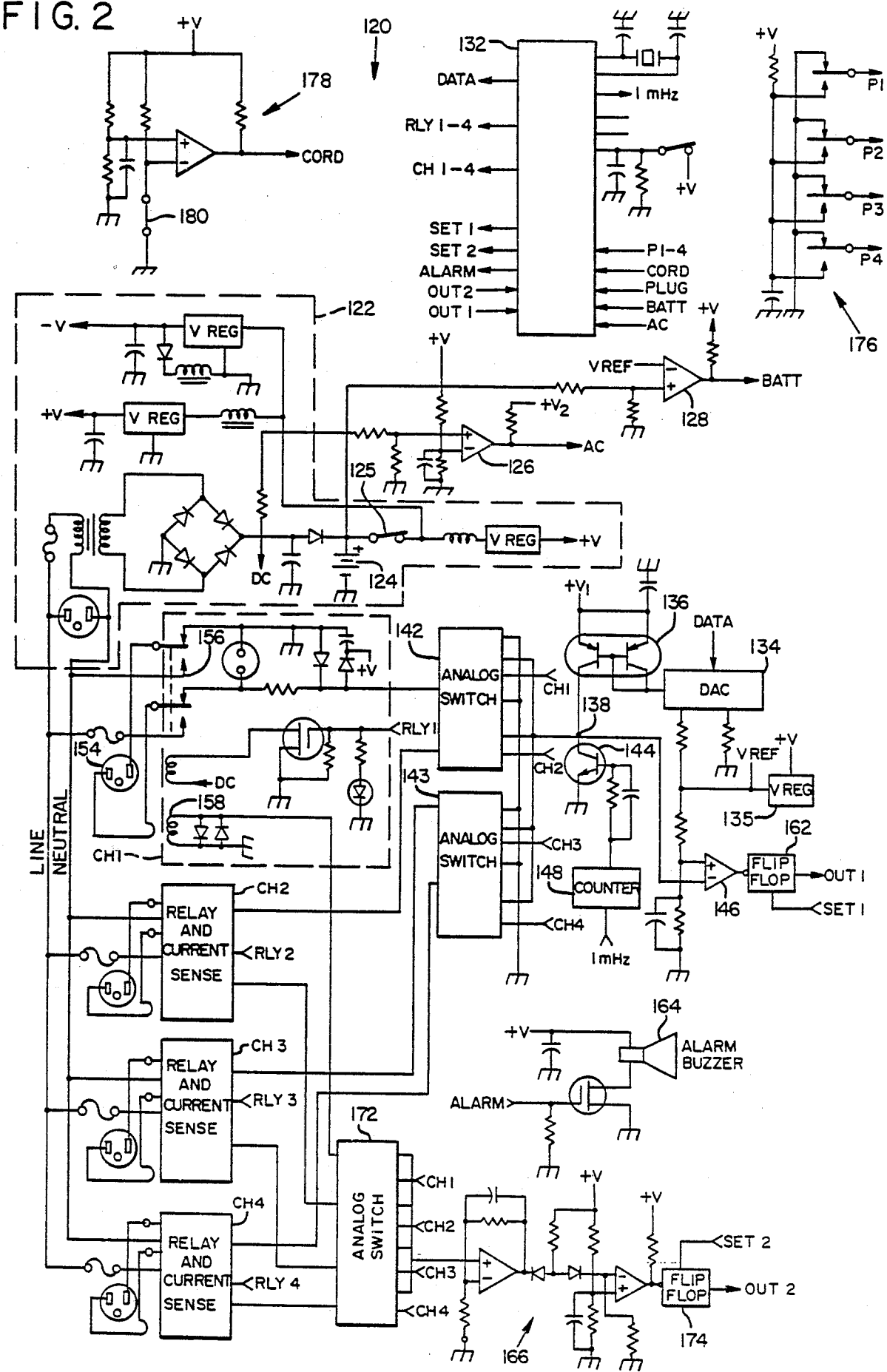
FIG. 2 is a schematic diagram of a second embodiment of the apparatus according to the invention.

FIG. 2 shows a second apparatus 120 embodying the invention. The apparatus 120 is similar to the apparatus 10 in many respects and only those aspects that differ will be discussed. For example, the disconnect circuitry 92 that generates the signal PLUG (active HIGH herein) is omitted for clarity.

The power supply 122 produces several supply voltages for powering elements within the apparatus and includes a battery 124 for backup, as before. Shown within supply 122 is the master switch 125 for controlling the operation of the apparatus 120. The power supply 122 also produces via a voltage comparator 126 an AC signal and via a voltage comparator 128 a BATT signal. The AC signal indicates whether AC power is being supplied to the power supply, and the BATT signal indicates whether the battery 124 is sufficiently charged. Both signals, which become a logic LOW when their power is lost, are routed to a microprocessor 132. If battery 124 begins to fail, microprocessor 132 issues a BATTERY LOW signal in response.

Within the apparatus 120, means are provided for producing a current signal in response to a command from microprocessor 132. Such means comprises a DAC (Digital Analog Converter) 134 coupled to a reference voltage source 135. The DAC 134 receives a digital signal from microprocessor 132 and in response draws a proportional current from one leg of current mirror 136. The opposite leg of the mirror 136 injects that current into a node 138 to which a monitored appliance is ultimately connected. At node 138, analog switches 142, 143, a transistor switch 144, and a voltage comparator 146 are coupled. Transistor switch 144 switches between conducting and nonconducting states in response to a one megahertz signal from microprocessor 132 divided by a counter 148. During a predetermined time in which the switch 144 is nonconducting, the injected current from mirror 136 is injected into the analog switches 142, 143. These switches provide four paths to each of the four separate channels CH1 through CH4, only one path of which is connected at any time to receive the current. As in the previous embodiment, each channel CH1 through CH4 includes a female receptable 154, a relay 156 in its normally closed position, and a current sensing transformer 158. The current injected into a channel such as CH1 produces a voltage proportional to the impedance at the point of current injection. The value of this impedance varies depending on whether an appliance is connected to or disconnected from the channel.

The voltage resulting from the impedance of the channel is sensed at voltage comparator 146 and compared against a voltage from reference voltage source 135. The output of comparator 146 controls the reset of a flip-flop 162 that is first set by microprocessor 132 each time it sends a digital signal to DAC 134. If the sensed voltage is less than the reference voltage, then the output signal OUT1 of flip-flop 162 remains a logic HIGH. OUT1 is routed to microprocessor 132 to generate an ALARM signal if and when OUT1 becomes a logic LOW. The ALARM signal in turn is routed to an alarm 164 of the same design as in the first embodiment.

As will be discussed in more detail hereinafter in operation of apparatus 120, the microprocessor 132 acts as a means for adjusting the amount of current drawn by DAC 134 to raise the sensed voltage until it is substantially equal to the reference voltage. A predetermined amount of current is determined by this adjustment for raising the sensed voltage to the level of the reference voltage with the reference impedance of the power cord and connected appliance present. Subsequently, the predetermined current is again injected into channels CH1 through CH4 according to a patterned sequence to produce a sensed voltage proportional to the present impedance at the point of signal injection. The sensed voltage level is then compared against the reference voltage level. With the appliance disconnected, the sensed voltage will exceed the reference voltage because the open circuit at receptacle 154 exhibits a higher impedance than the reference impedance. Consequently, the microprocessor will generate an alarm signal.

Unlike the first embodiment in which each channel 18 has its own means for setting a reference voltage for the reference impedance and its own current sensing circuit, the apparatus 120 multiplexes these circuits to each channel to minimize complexity. The channels CH1 through CH4 are selected by microprocessor command through analog switches 142 and 143 and RELAY signals RLY1 through RLY4. A signal sensing circuit 166 appears at the bottom of FIG. 2 coupled to each channel through analog switch 172. If current is not sensed in the channel presently connected, the output of flip-flop 174 in circuit 166 becomes a logic HIGH in response to a set command from the microprocessor 132. The output signal OUT2 notifies the microprocessor that the power has been shut off. The microprocessor then relays this information to the relay of the active channel via the relay signal RLY to de-energize the relay and connect the power cord to node 138 for an impedance check.

The apparatus 120 also includes a key pad 176 with switches P1 ON through P4 ON for notifying the microprocessor 132 that power is to be applied to an appliance. The microprocessor in turn energizes the corresponding relay. The key pad is protected by sensing circuit 178 that generates the signal CORD. If the keyboard cord, represented by the short 180 in circuit 178, is cut, the signal CORD switches to a logic LOW. The microprocessor 132 responds to the change in CORD to generate an ALARM signal to buzzer 164.

The operation of the second embodiment is best understood by reference to the flowcharts of FIGS. 3A through 3D. FIG. 3A shows the START-UP routine for microprocessor 132, with the appliances connected. Initially, the number 1 representing CH1 is stored in a variable MUX (box 202). Microprocessor 132 then proceeds to the DETERMINE subroutine (box 204) shown in FIG. 3B to determine the digital value of the current necessary for the sensed voltage to equal substantially the reference voltage. The DAC 134 is an 8-bit DAC and the number 8 is stored initially in the variable BITNUM (box 206). This variable refers to the place of the bit, the eighth place or the most significant bit in this case. The eighth bit is then set (box 208) and a digital signal of this value is transferred from the microprocessor to the DAC (boxes 210, 212) through a TRIAL variable. This digital signal in turn generates a current through current mirror 136 and a sensed voltage proportional to the impedance of the appliance connected to CH1. The microprocessor 132 then sets flip-flop 162 (box 214). If the sensed voltage proportional to the impedance at the point of signal injection exceeds the reference voltage at comparator 146, then the output of the comparator will cause the flip-flop to reset to a logic LOW. If the flip-flop remains a logic HIGH, on the other hand, then the current is insufficient. A logic LOW output of flip-flop 162 indicates the current is too high and the bit value of the current bit changes to zero (box 218). On the other hand, if the current is insufficient to produce a voltage substantially equal to the reference voltage, BITNUM is decremented (box 220). The bit number is then checked to see if it is the last bit (box 222), and if it is not, the next highest order bit is set to increase the current (box 208). This process continues until the current is adjusted to produce a sensed voltage as close to the reference voltage as possible. The microprocessor then returns to the START-UP routine in FIG. 3A (box 224).

At the next step in the START-UP routine, the digital value of the current represented by TRIAL is stored at a location in memory corresponding to the correct channel, CH1 (box 226). A current margin is then added and subtracted to that stored value to produce higher and lower limits (boxes 228, 230). The MUX variable is incremented (box 232) to the following channels and then checked to determine if the impedance in all channels CH1 through CH4 has been checked (box 234).

Once the START-UP routine is completed, the microprocessor 132 moves to the MONITOR routine shown in FIG. 3C. Starting with CH1 (box 236), the microprocessor checks if the current stored for that channel is at its maximum value (box 238). If it is, then a shortcut is taken and the digital signal with that maximum value is sent to the DAC 134 immediately (box 240). Flip-flop 162 is again set or toggled (box 242) and its output OUT1 checked (box 244) to determine the state of the flip-flop's output. If OUT1 is a logic HIGH, then no reset occurred and the appliance is assumed to be connected. The microprocessor then proceeds to the next channel (box 246). However, if the output is a logic LOW, a reset of flip-flop 162 has occurred, indicating the impedance at the point of current injection has increased.

Upon reset of flip-flop 162, the microprocessor 132 transfers to the ERROR subroutine indicated in FIG. 3D. First the DETERMINE subroutine of FIG. 3B is again executed (box 248). The result of this TRIAL is stored in variable CURRENT1 (box 250). The DETERMINE subroutine is again executed (box 252) and a second TRIAL is recorded (box 254) and stored as CURRENT2. The two TRIAL values are obtained to determine if the change in current was caused by a transient phenomena or a disconnected appliance. The CURRENT1 and CURRENT2 values are then checked to see if both are outside the upper and lower margins for the current (box 256). If they are, the alarm is sounded (box 258). If they are not, the change in current is assumed to have been a result of a transient and the microprocessor returns to the MONITOR routine (box 260).

Within the MONITOR routine, a similar procedure is followed if the current that is stored in the MUX variable is not the maximum current. First a digital signal corresponding to lower current limit value is routed to the DAC 134 (box 262). The flip-flop 162 is then set or toggled (box 264) and the flip-flop's output OUT1 is checked (box 266). If the output is a logic LOW then the ERROR subroutine in FIG. 3D is entered (box 270). If the output is a logic HIGH, then the upper limit is checked (box 268). The flip-flop 162 is again toggled (box 272) and OUT1 checked once again (boxes 274, 276). The same routine is applied to the following channel (box 246). Once all channels have been monitored (box 278), the MONITOR routine repeats (box 280).

Third Embodiment

Figure 4:
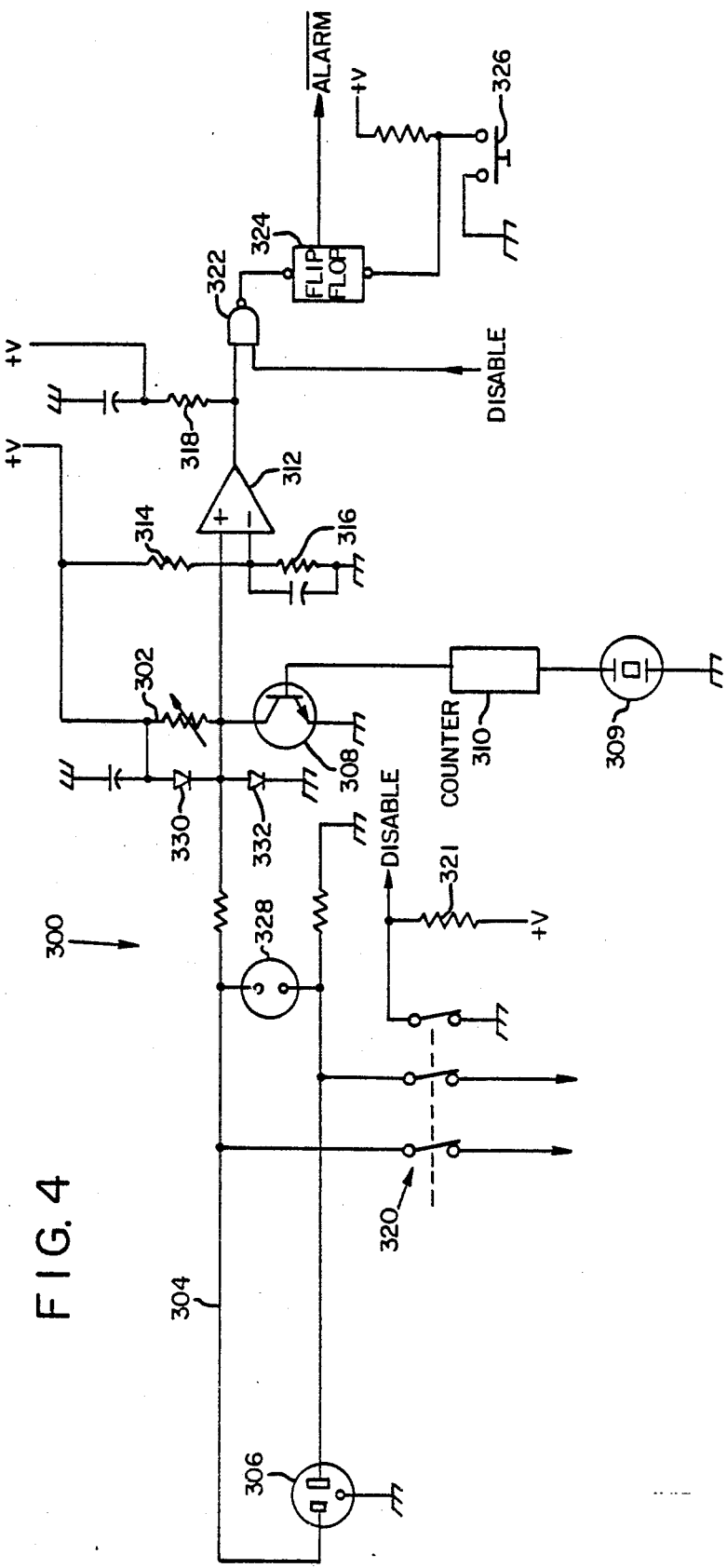
FIG. 4 is a schematic diagram of a third embodiment of the apparatus according to the invention.

FIG. 4 shows a third embodiment of the invention, an apparatus 300 adapted to be mounted within the chassis of a monitored appliance. Only that portion of the embodiment which differs from the first two embodiments is shown for clarity.

A current source comprising a supply voltage and a current-determining variable resistor 302 injects current into the LINE line of the appliance's power cord 304. The current produces a voltage proportional to the impedance looking through the power cord and the male plug 306 into the power source. The current is injected into LINE for a predetermined time set by transistor switch 308. The switch is driven between conductive and nonconductive states by a 62.5 kilohertz square wave signal at the transistor base, the current injected into the power cord 304 only while the switch 308 is not conducting. The square wave signal is produced by a one megahertz oscillator 309 and a counter 310 used as a frequency divider.

The voltage produced by the injected current is compared to a reference voltage at a voltage comparator 312. The reference voltage is derived from the supply voltage by dividing the supply voltage across resistors 314 and 316. The output of the comparator is a logic LOW so long as the reference voltage exceeds the assessed voltage. The output switches to a logic HIGH via pull-up resistor 318 connected to the supply voltage when the sensed voltage level changes to exceed the reference voltage level.

The monitored appliance receives line voltage from the power source through a connecting means represented by a switch 320. Two of the poles of the switch 320 apply voltage to the appliance, with the third pole forming a means to disable the comparator 312 when the appliance is on. Such means comprise a supply voltage across a resistor 321 to produce a voltage that is either grounded through a third pole or is presented as a DISABLE signal. Such disabling is required to remove the effects of the appliance on the sensed voltage. Closing the third pole generates a DISABLE signal of a logic LOW state which is logically combined with the comparator's output at NAND gate 322. The logic LOW from the DISABLE signal disables the gate 322 by forcing it to generate a logic HIGH output. With the appliance turned off, however, the DISABLE signal becomes a logic HIGH, enabling gate 322. The output of gate 322 is then controlled by the output of comparator 312. A logic HIGH from comparator 312 generates a logic LOW at the output of gate 322.

The output of gate 322 drives a flip-flop 324 that generates the $\overline{\text{ALARM}}$ signal. The flip-flop 324 is initially set to a high output, indicating no disconnection, by a master circuit (not shown) that includes keyed switch 326. Switch 326 when closed completes a circuit from the supply voltage to ground. The output of the flip-flop 324 then remains a logic HIGH until a logic LOW signal is received from gate 322 of the reset input to the flip-flop 324. This reset signal generates the $\overline{\text{ALARM}}$ signal. The flip-flop 324 stores the output of comparator 312 to be checked by the master circuit for an alarm condition.

To guard against power surges that may damage the impedance sensing circuitry, the apparatus 300 also includes a spark arrester 328 and clamp diodes 330 and 332.

Apparatus 300, like those of the other embodiments, has a start-up phase and a monitor phase. The apparatus must first be initialized. With the male plug 306 connected the power source and the appliance turned off, variable resistor 302 is adjusted until the sensed voltage is marginally less than the reference voltage. Once initialized, the variable resistor 302 need no longer be adjusted. Disconnection of the power cord from the power source will cause the present impedance seen looking down power cord to increase. This higher impedance will increase the sensed voltage level above the reference voltage level and cause comparator 312 to change its state. An $\overline{\text{ALARM}}$ will then be generated if the appliance is off and no DISABLE signal is present to disable gate 322.

Having illustrated and described the principles of the invention in two preferred embodiments, it should be apparent to those skilled in the art that the invention can be modified in arrangement and detail without departing from such principles. We claim all modifications coming within the spirit and scope of the following claims.

We claim:

1. An apparatus for warning of disconnection of an electrical appliance from a power source, comprising:
    means for injecting a signal into a power cord of an appliance to be monitored;
    means for setting in response to the injected signal a reference voltage corresponding to a reference impedance at the point of signal injection, the reference impedance defined as the impedance present with the appliance connected to the power source;
    means for sensing a present voltage level corresponding to a present impedance at the point of signal injection;
    means for comparing the reference voltage level against the present voltage level; and
    alarm means responsive to the comparing means for warning if the present voltage level has crossed the reference voltage level, thereby indicating the monitored appliance has been disconnected from the power source.

2. The apparatus of claim 1 including means for detecting disconnection of the apparatus itself from the power source, the alarm means responsive to the detecting means to warn if the apparatus has been disconnected.

3. The apparatus of claim 1 in which the sensing means includes a relay for connecting in one position the monitored appliance to the apparatus and for connecting in a second position the monitored appliance to the power source, the relay switched to the one position by turning off the monitored appliance and switched to the other position by turning on the monitored appliance.

4. The apparatus of claim 1 in which the reference voltage setting means and the sensing means comprise an impedance bridge having a reference arm including a variable capacitor for setting the reference impedance and a sensing arm for sensing the present impedance through the power cord.

5. The apparatus of claim 1 in which the injecting means comprises a square wave oscillator for injecting an AC signal into the power cord of the monitored appliance and into the reference voltage setting means.

6. The apparatus of claim 1 in which the comparing means comprises a voltage comparator for comparing the reference voltage proportional to the impedance of the power cord and monitored appliance against the present voltage proportional to the present impedance at the point of signal injection.

7. The apparatus of claim 1 in which the comparing means comprises a voltage comparator for comparing the reference voltage proportional to the impedance of the power cord and power source against the present voltage proportional to the present impedance at the point of signal injection.

8. The apparatus of claim 1 in which the injecting means includes means for injecting a predetermined current into the power cord of the monitored appliance for a predetermined time to produce a voltage proportional to the impedance of the power cord and monitored appliance.

9. The apparatus of claim 8 in which the reference voltage setting means includes means for adjusting the amount of current injected into the power cord.

10. The apparatus of claim 1 in which the injecting means includes means for injecting a predetermined current into the power cord of the monitored appliance for a predetermined time to produce a voltage proportional to the impedance of the power cord and power source.

11. The apparatus of claim 1 including multiplexing means for coupling and uncoupling the injecting means, reference setting means, and comparing means to each of a plurality of power cords in a predetermined pattern to monitor the present impedance of a plurality of appliances.

12. An apparatus for warning of disconnection of an electrical appliance from a power source, comprising:
    an oscillator for producing and injecting an AC signal into the power cord of an appliance to be monitored;
    an impedance bridge circuit having a reference arm including a variable capacitor for producing a reference voltage corresponding to the reference impedance of the power cord and monitored appliance and a sensing arm for producing a present voltage corresponding to the present impedance at the point of signal injection;

a voltage comparator coupled to both arms of the impedance bridge for monitoring the voltages produced on each arm; and an alarm responsive to the voltage comparator for warning if the voltage on the sensing arm exceeds the voltage on the reference arm, indicating that the present impedance has increased above the reference impedance because the monitored appliance has been disconnected.

13. The apparatus of claim 12 including a relay for coupling in one position the monitored appliance to the apparatus and for coupling in a second position the monitored appliance to the power source, the relay switched to the one position by turning off the monitored appliance and switched to the other position by turning on the monitored appliance.

14. The apparatus of claim 13 in which the apparatus includes a female receptacle for receiving the power cord plug of the monitored appliance, the apparatus further having its own power cord plug for connection to the power source.

15. An apparatus for warning of disconnection of an electrical appliance from a power source, comprising:

a reference voltage;

means for producing a current;

means for injecting the current for a predetermined time into the power cord of an appliance to be monitored to produce a present voltage proportional to the present impedance at the point of current injection;

means for comparing the present voltage against the reference voltage; and alarm means responsive to the comparing means to warn if the present voltage is no longer in a predetermined relation to the reference voltage, a change in the relation indicating a change in impedance caused by disconnection of the monitored appliance from the apparatus.

16. The apparatus of claim 15 including means for adjusting the current to produce the reference voltage proportional to the impedance of the power cord and monitored appliance at the point of current injection.

17. The apparatus of claim 15 including means for adjusting the current to produce the reference voltage proportional to the impedance of the power cord and power source at the point of current injection.

18. A method of warning of disconnection of an electrical appliance from a power source, comprising:

injecting a signal into a power cord of an appliance to be monitored;

setting in response to the injected signal a reference voltage corresponding to a reference impedance at the point of signal injection, the reference impedance present with the appliance connected to the power source;

comparing the reference voltage to a present voltage corresponding to the present impedance at the point of signal injection; and activating an alarm if the present voltage crosses the reference voltage.

19. The method of claim 18 in which the reference voltage is set to correspond to a reference impedance of the power cord and monitored appliance.

20. The method of claim 18 in which the reference voltage is set to correspond to a reference impedance of the power cord and power source.

* * * * *